Patented Mar. 17, 1925.

1,530,184

UNITED STATES PATENT OFFICE.

FRED H. LOFTUS, OF PITTSBURGH, PENNSYLVANIA.

BASIC OPEN-HEARTH FURNACE.

No Drawing. Application filed February 21, 1924. Serial No. 694,442.

*To all whom it may concern:*

Be it known that I, FRED H. LOFTUS, residing at Pittsburgh, in the county of Allegheny, in the State of Pennsylvania, have invented certain new and useful Improvements in Basic Open-Hearth Furnaces.

The general practice in building regenerative basic open hearth furnaces, is now, and has been more than 40 years, to construct the ports, front and back walls, and roof of silica brick, acid material. While it is generally conceded in this art that silica brick is the best known material for constructing these parts of a basic open hearth furnace, such construction has not been satisfactory, but on the contrary has given from the outset, and still does, no end of trouble, worry and expense, for the reason that the intense heat within the furnace, combined with the spray of iron oxide as is usually the case, melts and rapidly destroys the silica brick and the acid therefrom runs down and cuts out the basic bottom, thus materially shortening the campaign of the furnace and causing excessive repairs and loss of tonnage. Various attempts during the past 35 or 40 years have been made to overcome these objections, but without success. Among other things it was attempted to use magnesite brick for constructing the ports and back and front walls, but while magnesite does very well below the metal line, where is can be covered with basic refractory material, such as grain magnesite or dolomite, it was found, however, that where it could not be so covered and was exposed to the intense flame and other chemical reactions that it would spall, disintegrate and was less practical than silica brick for that purpose.

For the past twenty years or so, the plan most generally followed to render more efficacious these parts constructed of silica brick was to apply water cooling equipment of every imaginable form, particularly in connection with the ports in order to maintain the lines of the port and properly direct the flame into the furnace, also to the front and back walls above the metal line, all of which has met with comparatively little advantage, as this plan or method is costly from the point of fuel consumption and in maintaining pumping equipment and pipe lines for the purpose of supplying the water for the furnace. Some furnaces require 250,000 gallons of water daily to take care of the water cooled appliances utilized primarily in the ports and front and back walls. From this it will readily be seen that the cost of operating and maintaining a pumping station and water lines for a ten furnace operation is a very expensive factor in the basic open hearth furnace practice today.

It is therefore an object of my invention to provide a port, front and back wall construction for basic open hearth furnaces and other parts of the furnace which are subject to rapid erosion due to high temperature chemical action of the basic oxides in the furnace and the abrasion of the material due to the velocity of the gases, which will withstand the conditions encountered in basic open hearth practice and will materially lengthen the campaign of the furnace, entirely eliminate the necessity for water cooled appliances and wholly supplant the use of silica brick in the construction of such parts, and thus avoid the attendant disadvantages therefrom. It is a further object of my invention to provide a construction for these parts of a basic open hearth furnace which will have a high fusion point, which will resist chemical reaction and which possesses sufficient density and hardness to withstand the abrasion of the gases at the working temperature of the furnace and which possesses sufficient compressive strength to enable it to be formed into arches, roofs and vertical walls above the metal line without danger of the material flowing or spalling, when subject to pressure, under the working temperature of the furnace.

The above and other features of novelty, advantages and capabilities will become apparent as a description of my invention follows.

It is well understood in the art that regenerative basic open hearth furnaces used for metallurgical purposes are gas furnaces adapted for manufacturing steel in which the hearth is usually made up of a layer of second grade brick, a layer of first grade brick, a layer of magnesite brick and an inner layer of basic material either burnt dolomite or magnesite. The side walls, roof air and gas ports of the furnace are constructed of silica brick, an acid material. At the joint where the hearth joins the remainder of the furnace there is usually placed between the two materials, that is the basic and acid material, to retard their fluxing a neutral joint of passive material, usually chrome. This form of construction of regenerative basic open hearth furnace being so well understood in the art, it is not thought necessary to illustrate the construction by means of drawings, and as my invention primarily relates to the substitution of material for the ports, front and back walls and roof, a drawing would hardly seem necessary.

After several years, of experimenting to solve the problem heretofore mentioned, I have found that by cutting chrome stone in its natural state into suitable shapes or forms and building the ports and front and back walls therefrom, that I have produced a construction which overcomes all the disadvantages and objections heretofore pointed out. Therefore the important feature of my invention consists in constructing the ports, back and front walls or roof of natural chrome stone cut into proper shapes. Native raw chrome stone is so extremely hard that all prior to my invention apparently thought it impossible to cut for after an exhaustive investigation I was unable to find where it had ever been done and I was repeatedly advised by those skilled in the art that it could not be done, however, after months of experimenting I discovered that this material could be cut successfully, by operating a circular saw at a very slow speed and feeding the work in such a manner that the teeth of the saw will remove the material by breaking or tearing the individual grains apart rather than by cutting. If the saw be permitted to run at a high velocity and feed slowly the chrome stone would then act as an abrasive and grind the teeth of the saw regardless of what material made, whether carborundum or other material, but by driving the saw comparatively slow, yet giving it a heavy feed the abrasive action is overcome.

In cutting the blocks for the ports from the raw chrome stone they are cut in such shapes and sizes as to be laid in the form of an arch without the use of cement or the like as is customary in other brick work constructions so that the blocks can be firmly bonded together with the fewest number of joints without being so large or heavy that they cannot be handled by one man.

Having thus described my invention, I claim:

1. In a regenerative basic open hearth furnace the combination of a port above the metal line constructed of properly shaped blocks cut from raw chrome stone.

2. In a regenerative basic open hearth furnace, the combination of a wall above the metal line constructed of blocks cut from raw chrome stone.

3. In a furnace of the class described a refractory capable of standing intense heat and abrasion constructed of blocks cut from raw chrome stone.

In witness whereof, I have hereunto subscribed my name to this specification in the presence of witnesses.

FRED H. LOFTUS

Witnesses:
CHARLES A. LUX,
CLARA B. SANDOMIRE.